US011737596B2

(12) United States Patent
MacPherson

(10) Patent No.: US 11,737,596 B2
(45) Date of Patent: Aug. 29, 2023

(54) COFFEE-BASED BEVERAGE PREPARATION SYSTEM AND METHODS FOR USING THE SAME

(71) Applicant: Charles D. MacPherson, Santa Barbara, CA (US)

(72) Inventor: Charles D. MacPherson, Santa Barbara, CA (US)

(*) Notice: Subject to any disclaimer, the term of this patent is extended or adjusted under 35 U.S.C. 154(b) by 227 days.

(21) Appl. No.: 16/086,962

(22) PCT Filed: Mar. 21, 2017

(86) PCT No.: PCT/US2017/023336
§ 371 (c)(1),
(2) Date: Sep. 20, 2018

(87) PCT Pub. No.: WO2017/165365
PCT Pub. Date: Sep. 28, 2017

(65) Prior Publication Data
US 2019/0099038 A1 Apr. 4, 2019

Related U.S. Application Data

(60) Provisional application No. 62/312,713, filed on Mar. 24, 2016.

(51) Int. Cl.
*A47J 31/44* (2006.01)
*A23L 3/365* (2006.01)
(Continued)

(52) U.S. Cl.
CPC ............... *A47J 31/44* (2013.01); *A23L 3/36* (2013.01); *A23L 3/365* (2013.01); *A47J 31/002* (2013.01)

(58) Field of Classification Search
CPC .... A23F 5/32; A23F 5/48; Y10T 436/107497; F26B 5/06
See application file for complete search history.

(56) References Cited

U.S. PATENT DOCUMENTS 2,754,399 A 7/1956 Edman
2,906,193 A * 9/1959 McCauley ............ A47J 31/42
34/562
(Continued)

FOREIGN PATENT DOCUMENTS

CN 102648823 A * 8/2012
EP 1639923 A1 * 3/2006 ............ A47J 31/401
(Continued)

OTHER PUBLICATIONS

International Search Report issued in corresponding International Patent Application No. PCT/US2017/023336 dated Jul. 21, 2017.
(Continued)

*Primary Examiner* — John J Norton
(74) *Attorney, Agent, or Firm* — Morgan, Lewis & Bockius LLP

(57) ABSTRACT

A coffee-based beverage preparation system is disclosed that receives a brewed coffee frozen ice block and, in certain embodiments, prepares a brewed coffee beverage at a desired temperature without the requirement to add water from a water reservoir. In one embodiment, the coffee-based beverage preparation system includes a preparation chamber for receiving a degassed frozen brewed coffee beverage and a plurality of heating elements configured to apply heat to the preparation chamber to melt the degassed frozen brewed coffee beverage. The coffee-based beverage preparation system also includes an outlet port comprising in fluidic communication with the preparation chamber and an electronically controlled valve secured to the outlet port that is configured release the fluid content of the preparation chamber into a receiving vessel, such as when the fluid reaches a predetermined temperature.

20 Claims, 8 Drawing Sheets

(51) Int. Cl.
*A23L 3/36* (2006.01)
*A47J 31/00* (2006.01)

(56) References Cited

U.S. PATENT DOCUMENTS

| | | | | |
|---|---|---|---|---|
| 3,408,919 A * | 11/1968 | Guggenheim | ............ | A23F 5/32 |
| | | | | 62/71 |
| 3,561,426 A * | 2/1971 | Wheeler | ............ | A23F 5/243 |
| | | | | 126/343.5 A |
| 3,601,901 A * | 8/1971 | Rader | ............ | F26B 5/065 |
| | | | | 34/92 |
| 3,620,034 A * | 11/1971 | Ganiaris | ............ | A23F 5/30 |
| | | | | 62/541 |
| 3,653,929 A * | 4/1972 | Dwyer | ............ | A23F 5/32 |
| | | | | 426/385 |
| 3,759,162 A * | 9/1973 | Maxwell | ............ | A47J 31/3619 |
| | | | | 99/289 R |
| 4,370,865 A * | 2/1983 | Hibino | ............ | F25C 1/12 |
| | | | | 62/347 |
| 4,604,516 A * | 8/1986 | Metz | ............ | F24H 9/2014 |
| | | | | 392/471 |
| 5,539,856 A | 7/1996 | Andrew et al. | | |
| 5,727,453 A * | 3/1998 | Tippmann | ............ | F28B 5/00 |
| | | | | 62/81 |
| 6,189,440 B1 * | 2/2001 | Amundson | ............ | A23L 3/22 |
| | | | | 99/452 |
| 6,324,964 B1 * | 12/2001 | Niederberger | ............ | A47J 31/40 |
| | | | | 99/302 R |
| 6,339,985 B1 * | 1/2002 | Whitney | ............ | A47J 31/061 |
| | | | | 99/286 |
| 8,503,870 B2 * | 8/2013 | Gaulard | ............ | F24H 9/2028 |
| | | | | 392/471 |
| 9,307,777 B2 * | 4/2016 | MacPherson | ............ | A23F 5/26 |
| 9,346,611 B1 * | 5/2016 | Roberts | ............ | B65D 85/72 |
| 10,470,605 B2 * | 11/2019 | Ergican | ............ | A47J 31/407 |
| 10,973,240 B1 * | 4/2021 | Fonte | ............ | B65D 85/8046 |
| 11,021,319 B2 * | 6/2021 | Fonte | ............ | A23G 9/28 |
| 2002/0051632 A1 * | 5/2002 | Kodden | ............ | A47J 31/545 |
| | | | | 392/471 |
| 2003/0196554 A1 * | 10/2003 | Koontz | ............ | A47J 31/402 |
| | | | | 99/323.3 |
| 2003/0198465 A1 * | 10/2003 | Cai | ............ | A47J 31/542 |
| | | | | 392/471 |
| 2005/0008744 A1 * | 1/2005 | Mazzola | ............ | A47J 31/0631 |
| | | | | 426/425 |
| 2006/0037481 A1 * | 2/2006 | Bicht | ............ | A47J 31/545 |
| | | | | 99/279 |
| 2006/0102010 A1 * | 5/2006 | Burrows | ............ | A47J 31/4475 |
| | | | | 99/279 |
| 2010/0003022 A1 * | 1/2010 | Reyhanloo | ............ | A47J 31/54 |
| | | | | 392/465 |
| 2010/0034950 A1 * | 2/2010 | Jones | ............ | F25C 1/00 |
| | | | | 426/595 |
| 2010/0098812 A1 | 4/2010 | Le et al. | | |
| 2013/0209627 A1 * | 8/2013 | MacPherson | ............ | A23L 3/364 |
| | | | | 426/234 |
| 2014/0053734 A1 * | 2/2014 | Santi | ............ | A47J 31/4482 |
| | | | | 99/282 |
| 2014/0150664 A1 * | 6/2014 | Corti | ............ | A47J 31/36 |
| | | | | 99/283 |
| 2015/0157168 A1 * | 6/2015 | Burrows | ............ | A47J 31/462 |
| | | | | 426/231 |
| 2015/0201796 A1 * | 7/2015 | Kuempel | ............ | A47J 31/521 |
| | | | | 99/283 |
| 2016/0288988 A1 * | 10/2016 | Roberts | ............ | A23F 5/36 |
| 2017/0347690 A1 * | 12/2017 | Benedetti | ............ | B67D 3/0019 |

FOREIGN PATENT DOCUMENTS

| | | | |
|---|---|---|---|
| KR | 2010049965 A * | 5/2010 | |
| KR | 1485823 B1 * | 1/2015 | |

OTHER PUBLICATIONS

Written Opinion issued in corresponding International Patent Application No. PCT/US2017/023336 dated Jul. 21, 2017.

* cited by examiner

COFFEE-BASED BEVERAGE PREPARATION SYSTEM AND METHODS FOR USING THE SAME

PRIORITY CLAIM

This application is a 35 U.S.C. § 371 filing based on International Application Serial No. PCT/US2017/023336, filed Mar. 21, 2017, which claims the benefit of U.S. Provisional Patent Application No. 62/312,713, filed on Mar. 24, 2016, both of which are incorporated by reference herein in their entirety.

FIELD OF THE INVENTION

The present invention relates to beverages and more specifically to a method a coffee-based beverage preparation system, and methods for using the same to prepare brewed beverages.

BACKGROUND OF THE INVENTION

Traditional home coffee brewing systems typically have a water reservoir in which the consumer will add water when preparing brewed coffee. The brewer also contains a shower head to evenly disperse the water over coffee grounds placed in a brew basket. The quality of the brewed coffee is dependent on factors such as the water quality placed in the reservoir, the level of mineral in the preparation system (which traditionally must descaled every couple of months), the quality and freshness of the coffee beans as well having the correct grind size for the beans. Additionally, the extraction process for brewing coffee from ground beans is extremely sensitive and requires extracting the coffee from the grounds to ideal degree, controlled by the correct time and correct temperature. Many brewing machine designs do a poor job of maintaining the water temperature at the correct temperature for optimal extraction over the entire brew cycle. Additionally, many brewers fail to complete the brew process in the optimal time of 4-6 minutes. Thus, the coffee brewed from traditional home coffee brewing system can suffer from the negative effects of the home brewing environment (for example, because the brewing takes place in the preparation system itself).

The introduction of single cup brew systems attempted to reduce the variables that the consumer needed to control in the brew process. The single cup brewers eliminated the coffee ground basket and replaced it with prepackaged ground coffee pods. The pods contained a premeasured amount of ground coffee stored in an oxygen permeable container pods. Although these types of brewers provide some added convenience for the consumer (e.g., by having the coffee beans packaged in convenient ready-to-use format), the quality of the coffee is still likely suffer due to oxidation of the coffee grounds while they are stored in the oxygen permeable container pods. As well, the consumer must still supply the water, and if this water is not of sufficiently good quality, then the final brewed beverage quality will suffer. The brewing systems also must still be descaled from time-to-time to remove mineral buildup if the water contains dissolved salts and minerals. The descaling process typically requires a consumer to add a mixture of undiluted vinegar to the brewing system in order to flush out the mineral buildup. This process can leave residue that adversely affects the quality and taste of subsequent brewed coffee. Also the consumer must remove the spent grounds and filter or pods from the brewer before the next use.

Finally, there is also growing concern over the environmental impact of these brewers due to difficulty in recycling or composting the spent pods. Thus, there is a need for an improved coffee beverage preparation system that solves these problems and introduces other advantages as well.

SUMMARY OF THE INVENTION

The present disclosure relates to a coffee-based beverage preparation system, and methods for using the same, which can prepare fresh tasting brewed beverage in a home preparation system without the requirement to add water from a water reservoir. In particular, a preparation system is disclosed that can prepare ready-to-drink brewed coffee beverages from a frozen ice block brewed coffee that have been pre-brewed under ideal conditions by a professional brewer and frozen in a ready-to-use oxygen permeable container, such as those produced according to the methods describes by as described in U.S. Pat. No. 9,307,777 by the same inventor, which is hereby incorporated herein by reference in its entirety except to the extent there is conflicting disclosure, in which case the present disclosure shall control.

In one embodiment, the present disclosure describes a coffee beverage system that receives a frozen ice block of brewed coffee through a lid or opening in a preparation chamber. The system selectively applies heat to the frozen ice block at a given temperature for a predetermined period of time and number of intervals in such a way that localized boiling (which way may lead to the degradation of coffee flavor and aroma compounds) of the coffee beverage as the frozen ice block melts is minimized or prevented. In some embodiments, an agitator or stirrer is provided in the preparation chamber that stirs the runoff from the melting frozen ice block and helps maintain a more constant temperature in the runoff, such that the heat is more efficiently transferred to the frozen ice block.

In another embodiment, the coffee beverage system may include two chambers, a first preparation chamber for heating a block of frozen liquid and a second preparation chamber for heating the liquid beverage to the desired temperature for consumption. In some embodiments, the two chambers are connected by a flow path, such as a through-hole or a channel connecting the two chambers. During use, the first preparation chamber will receive a frozen ice block of brewed coffee through a lid or opening in the first preparation chamber. The first preparation chamber selectively applies heat to the frozen ice block of brewed coffee to melt the frozen block. As the frozen ice block melts, the runoff will drain into the through-hole or channel to enter into the second preparation chamber to be heated to the desired temperature for consumption. Beneficially, the two chamber approach allows the system to apply full heat to the first preparation chamber without concern that there will be localized boiling of the liquid runoff in the first preparation chamber. In some embodiments, the system may automatically delay the heating of the runoff liquid in the second preparation chamber for a period of time in order to allow a sufficient amount of runoff liquid to flow from the first preparation chamber to the second preparation chamber.

In yet another embodiment, the system allows a user to select a desired temperature for the brewed coffee beverage and the system selectively controls the heating elements in a way that produces a coffee beverage at the desired temperature. For instance, a user may select 140 degrees Fahrenheit for an extra hot coffee beverage, 120 degrees Fahrenheit for an ideal coffee beverage, 100 degrees Fahrenheit for a moderately warm beverage, or a cooler temperature for a cold beverage that can be used to make iced coffee. In certain embodiments, the flow from the preparation chamber(s) into a drinking vessel may be regulated by a valve that is opened or closed at certain points during the brewing process such that the coffee is released at desired temperature.

DETAILED DESCRIPTION

Figure 1:
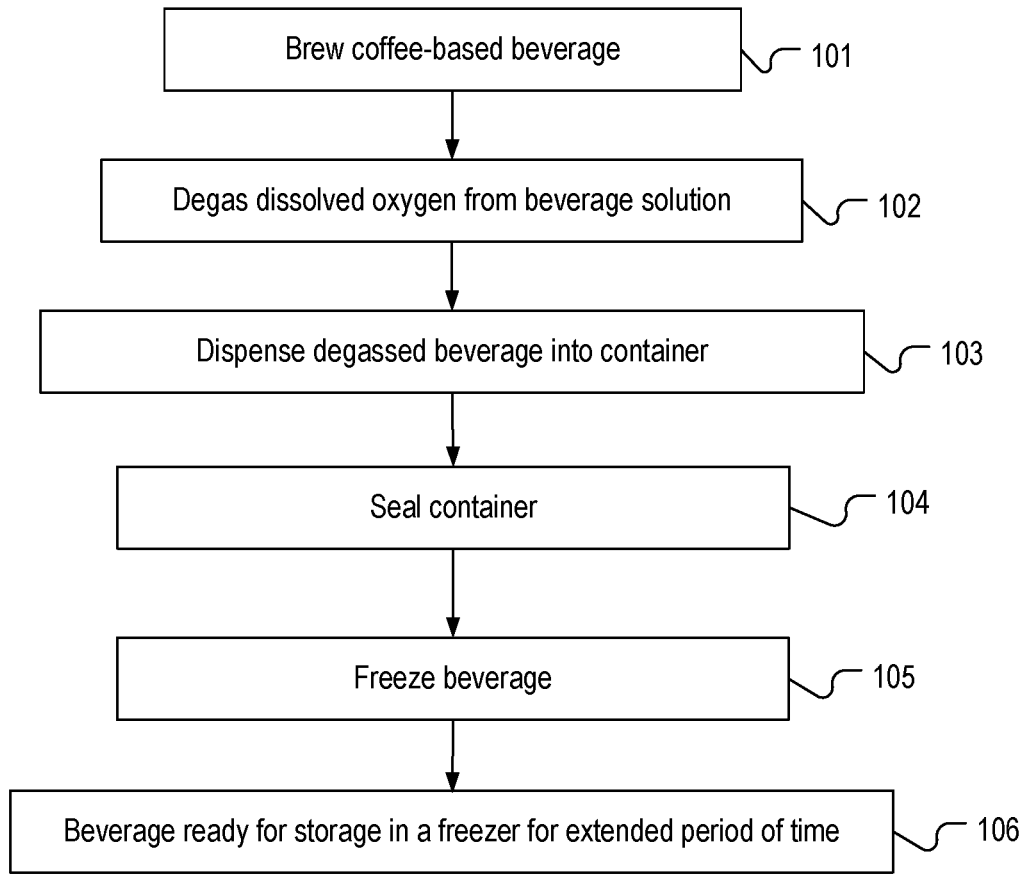
FIG. 1 depicts an exemplary process diagram depicting the steps for preparing a frozen degassed beverage according to some embodiments.

Among other things, the current disclosure provides an unexpected new approach to brewed coffee preparation that addresses the deficiencies of current coffee preparation systems, including those outlined above and others, as well as provides unforeseen additional benefits the producer of high-quality brewed beverages and coffee beverage systems.

In one embodiment disclosed herein, a brewed beverage preparation system is provided that no longer requires a water reservoir and that allows a brewed coffee product to be obtained without the consumer needing to add water during the heating process. As well, the brewed beverage preparation system according to some embodiments does not contain a brew basket, or require the addition of coffee grounds, or require a water shower head. In these embodiments, the brewed beverage preparation only requires the consumer to add an ice block of brewed coffee to a preparation chamber.

While the advantages realized by such a system are many, it is particularly beneficial to maintaining the high-quality and state of the brewed beverage inasmuch as there is no water added by the user (which may be low quality water containing undesired mineral content), no grinding of coffee beans required, no filters, and no descaling cleaning required (which may residues that affect taste and aroma). Additionally, the system does not require the use of pods or filters as part of the brewing process, thereby alleviating growing environmental concerns with disposable pods and containers. Although not explicitly listed, additional benefits of coffee preparation systems according to the systems and methods described herein will be apparent to one of ordinary skill.

By way of introduction, the ability to maintain the flavor of freshly brewed beverages for extended periods of time provides a method for the long-term storage of beverages (including but not limited to coffee-based beverages) that requires no reconstitution—only reheating of the product. Thus, the methods in accordance with the present teachings produce a product that allows the consumer the convenience of purchasing a frozen beverage product that can be stored in the freezer section of a refrigerator for an extended period of time and then taken out and reheated, so as to experience the taste and flavor of the beverage as if it were freshly brewed. In the case of a coffee-based beverage, the consumer is not required to purchase freshly roasted coffee beans, grind the beans with a grinding tool, have access to and/or operate a coffee brewing system, or have access to high quality water to add to the coffee brewer in order to enjoy a coffee flavored beverage having the flavor of freshly brewed coffee. On the contrary, the consumer need only have access to a freezer to store the containers containing the frozen coffee beverage and a heating source such as a microwave oven or a stove top cooking element to heat the frozen coffee beverage. Moreover, the consumer does not need to add water to the frozen beverage in order to consume the beverage. The only step is to heat the frozen beverage to the desired temperature. Of course, the consumer may also wish to add additional ingredients including but not limited to milk, cream, sugar, honey, or the like, although the number and amounts of any such optional ingredients will be determined by the consumer's taste.

In some embodiments, a beverage in accordance with the present teachings is tea-based—in other words, a beverage derived from a brewing process in which one or more soluble compounds of tea leaves are extracted by hot water and/or steam. Representative tea-based beverages in accordance with the present teachings can prepared from a variety of types of teas including but are not limited to white tea, yellow tea, green tea, oolong, tea, black tea, post-fermented tea, herbal tea (i.e., leaves, flowers, fruit, herbs or other plant material which, technically, are not teas inasmuch as they are devoid of *Camellia sinensis*), and the like, and combinations thereof. Representative types of tea-based beverages in accordance with the present teachings include but are not limited to bata bata, bubble tea (foam tea), cha manao, cha yen (Thai tea), chai (masala chai), Hong Kong milk tea (pantyhose milk tea), iri ko, kashmiri chai, kombucha, matcha, obuku cha, sweet tea, tapioca pearl tea (boba tea), tea punch, the tarik (Malaysian pulled tea), Tibetan yak butter tea, and the like, and combinations thereof.

In some embodiments, a beverage in accordance with the present teachings is coffee-based—in other words, a beverage derived from a brewing process in which one or more soluble compounds of coffee beans are extracted from ground coffee beans by hot water and/or steam. The coffee-based beverage may be produced from a specific type of coffee bean (e.g., the Kona bean) or from a blend of different types of beans grown in different geographical areas. Representative bean types include but are not limited to Columbian, Sumatra, Jamaica Blue Mountain, Panama, and the like, and combinations thereof.

Representative coffee-based beverages in accordance with the present teachings include but are not limited to affogato, cafè Americano, café au lait, café bombón, caffè latte, café mélange, coffee milk, cafe mocha, ca phe sua da, cappuccino, cortado, eiskaffee, espresso, flat white, frappuccino, galão, Greek frappé coffee, iced coffee, Indian filter coffee, instant coffee, Irish coffee, kopi susu, liqueur coffee, macchiato, mochasippi, naked coffee, Turkish coffee, Vienna coffee, yuanyang, and the like, and combinations thereof.

In some embodiments, the preservation of freshly brewed coffee flavor involves the removal of dissolved oxygen gas from the coffee-based beverage solution prior to the freezing of the beverage into a solid state. The present inventor has discovered—surprisingly and unexpectedly—that without lowering the dissolved oxygen content within the brewed coffee-based beverage solution prior to freezing, there will be significant changes in the chemical composition of the beverage during storage, which result in a noticeable loss of desirable flavor when the coffee is reheated to a temperature of between 60° C. (140° F.) and 80° C. (176 ° F.) at which brewed coffee is typically drunk. This discovery is surprising and unexpected in view of the fact that some coffee brewers (e.g., the brewer sold under the trade name TRI-FECTA by Bunn-O-Matic Corporation, the brewer sold under the trade name RU-1000 by the Wilbur Curtis Company, etc.) deliberately inject air into the liquid as a way to aerate and agitate the liquid, thereby keeping solids dissolved. Moreover, it has been reported that oxygen dissolved in water is responsible for drawing out the rich flavor of the coffee bean during the brewing process, such that oxygen enriched water—for example, the water sold by Cielo (Austin, Tex.)—results in coffee having an enhanced flavor.

In stark contrast to the implications of the above reports, the present inventor has discovered that freshly brewed coffee-based beverage samples in which the beverage was frozen at temperatures below its freezing point without prior elimination or reduction of the oxygen content dissolved in the beverage did not maintain the desired freshly brewed flavor for an extended period of time. It was further discovered that freshly brewed coffee-based beverages which were degassed and stored in a refrigerator between 0° C. (32° F.) and 5° C. (41° F.), such that the beverage was not frozen, did not maintain the original freshly brewed coffee flavor to the same extent achieved by a degassed sample that was also frozen. Thus, in some embodiments, the combination of reducing dissolved oxygen content followed by freezing of the coffee-based beverage below its freezing point in a closed container immediately after brewing preserves the flavor of the freshly brewed coffee for an extended period of time ranging from one day to at least 12 months when stored below the beverage's freezing point. In some embodiments, the coffee-based beverage is an espresso, latte, iced coffee, or the like.

By way of general introduction, a method for producing a brewed beverage in accordance with the present teachings includes brewing the beverage and degassing the beverage prior to storing the beverage in a sealed container. In some embodiments, the method further comprises freezing the beverage.

In some embodiments, the beverage comprises water and the water is degassed prior to being used in the brewing. In other embodiments, the beverage is degassed after the brewing and prior to sealing the container. In some embodiments, the degassing is achieved by purging with a gas selected from the group consisting of nitrogen, argon, helium, neon, sulfur hexafluoride, and combinations thereof.

In some embodiments, the method further comprises dispensing the beverage into a container. In some embodiments, the method further comprises substantially filling a headspace above the beverage with an inert atmosphere, which, in some embodiments, comprises a gas selected from the group consisting of nitrogen, argon, helium, neon, sulfur hexafluoride, and combinations thereof In some embodiments, the method further comprises sealing the container. In some embodiments, the container is heat-sealed with a metal-containing seal (e.g., an aluminum-containing lid). In other embodiments, the container is sealed with a non-metal seal (e.g., a seal made from polypropylene, polycarbonate, polyethylene, polyethylene terephthalate, or the like, and combinations thereof). In some embodiments, at least a portion of the container (e.g., the portion that retains the beverage after the seal has been removed) is microwavable. In some embodiments, both the container and the seal are microwaveable. In embodiments in which the seal is microwavable, it may be desirable to puncture the seal prior to heating in the microwave in order to prevent the container from exploding.

In some embodiments, the degassing reduces dissolved oxygen content in the beverage by at least about 50 percent, in some embodiments by at least about 75 percent, in some embodiments by at least about 90 percent, in some embodiments by at least about 95 percent, and in some embodiments by at least about 99 percent. In some embodiments, the degassing reduces dissolved oxygen content in the beverage to less than about 2.0 ppm, and in some embodiments to less than about 1.0 ppm.

In some embodiments, the beverage comprises a coffee concentrate, which will be diluted prior to consumption. In such embodiments, the water used for dilution can be added to the container containing the frozen beverage before or after the container is sealed, such that mixing with the concentrate does not occur until the beverage and/or the water used for the dilution (e.g., the water and the beverage are both frozen in the container but separated by an interface) begin to thaw.

Referring now to FIG. 1, in some embodiments, the process for producing a frozen coffee-based beverage begins with step 101 of brewing the coffee-based beverage. Those skilled in the art will recognize that while the base ingredient of this beverage is coffee, additional ingredients and flavors may also be added, including but not limited to dairy products, sugars, sweeteners, and the like, in a raw or pre-processed form. It is to be understood that a number of different formulations may be turned into coffee-based liquids in accordance with the present teachings.

In some embodiments, as shown in FIG. 1, the second step of the process involves reducing the dissolved oxygen content of the coffee-based beverage by degassing 102. The reduction of dissolved oxygen in coffee-based beverage solution prior to freezing reduces the exposure of sensitive flavor compounds in the coffee to the dissolved oxygen. For example, without limitation and without intending in any way limit the scope of the appended claims or their equivalents, it is presently believed that degassing the brewed coffee-based beverage prior to freezing results in the formation of significantly fewer bubbles and voids in the resulting ice and, therefore, fewer channels through which any oxygen entering the package could penetrate into the frozen beverage and begin to chemically react with the flavor-inducing coffee compounds. Therefore, having the coffee flavor compounds of the beverage encapsulated in ice with few or no defects—a benefit of having first removed the bubble-forming dissolved oxygen prior to freezing—allows for the storage of coffee-based beverages for extended periods of time.

Degassing of the coffee-based beverage prior to packaging and freezing can be accomplished by a variety of techniques. It is also envisioned that the degassing process can be performed at any point in the process up to the time the container is sealed. In some embodiments, degassing is performed prior to freezing of the product (if the product is to be frozen) by degassing the water to be used in the brewing process prior to the brewing step 101. In other embodiments, degassing of the beverage solution is performed after the brewing process 101 is complete and prior to freezing (although, in some embodiments, degassing after brewing may not be desirable if there are volatiles that make desirable contributions to flavor and/or aroma that could potentially be driven out). In step 102 shown in FIG. 1, the degassing process occurs immediately prior to filling the disposable containers and before freezing. Performing the degassing process immediately prior to freezing reduces the risk that oxygen can be re-introduced into the solution and reduces the time in which the beverage solution needs to be maintained under an inert atmosphere before it is packaged, sealed, and frozen.

In some embodiments, the degassing of the coffee-based beverage shown in step 102 of FIG. 1 is accomplished by the ultra-sonic agitation of the beverage solution in a vessel where the headspace is filled with an inert atmosphere such as nitrogen gas. Other gases that could be chosen include but are not limited to argon, helium, neon, sulfur hexafluoride, and combinations thereof. In some embodiments, the ultrasonic agitation may be performed for a period ranging from about 1 second to about 60 minutes depending on the size of the vessel holding the beverage, the power of the ultrasonic transducer, and the desired reduction of the dissolved oxygen concentration. In some embodiments, the ultra-sonic agitation can be stopped when the dissolved oxygen concentration in the beverage is less than about 10 percent of the concentration before the start of ultra-sonic agitation.

In some embodiments, the degassing process 102 is achieved by connecting the closed vessel containing the beverage solution to a vacuum pump, which lowers the atmospheric pressure in the vessel and causes the release of dissolved gases in the beverage solution. Agitation or stirring can also be performed during the vacuum pumping process to assist in the elimination of the dissolved gases.

In some embodiments, the degassing process 102 is performed by passing the beverage solution through a polymeric semipermeable membrane tube surrounded by a vacuum. The polymeric membrane is designed such that dissolved gases in the beverage solution can permeate the membrane while water and other organic compounds in the beverage cannot. In other embodiments, degassing is performed by heating the water and in some in cases heating the water under an inert atmosphere. Examples of representative degassing processes for solvents that can be used in accordance with the present teachings are described in U.S. Pat. No. 5,340,384, the entire contents of which are incorporated herein by reference, except that in the event of any inconsistent disclosure or definition from the present specification, the disclosure or definition herein shall be deemed to prevail.

In some embodiments, the degassing process 102 is accomplished by vigorous agitation of the beverage in a closed container that has been purged with an inert gas such as nitrogen. Other potential inert gases can be used instead of or in combination with nitrogen, including but not limited to argon, helium, neon, sulfur hexafluoride, and combinations thereof. The beverage is agitated for a time of between about 1 second and about 5 minutes after which the excess pressure in the container is released by opening a valve. The process is repeated until no noticeable pressure increase is observed. Before each agitation cycle, the atmosphere above the beverage in the vessel can be purged with nitrogen for a period of time to remove any residual oxygen from the atmosphere. The amount of time for the purge process will be dependent on the size of the vessel and the desired reduction in the concentration of dissolved oxygen in the beverage.

In some embodiments, the degassing process is accomplished by bubbling an inert gas such as nitrogen through the beverage in a container, such that dissolved oxygen in the beverage solution is displaced by the inert gas. In some embodiments, in addition to the bubbling, the headspace is also filled with an inert gas. In some embodiments, the bubbling process can proceed for a time ranging from minutes to several hours depending on the volume of beverage being degassed, the bubbling rate, and the desired reduction in the concentration of dissolved oxygen. The degassing by bubbling can also be assisted with stirring and/or with a vacuum applied to the headspace above the beverage. As will be appreciated by the skilled artisan, any combination of degassing techniques—both the techniques described above as well as all manner of additional degassing techniques—may be used to achieve the degassed beverage solution of 102 without deviating from the present teachings. It is to be understood that the particular degassing technique or techniques used in accordance with the present teachings is not restricted.

In the third step 103 of the flowchart shown in FIG. 1, the degassed coffee-based beverage is dispensed into containers, which, in some embodiments, are disposable. The disposable containers can be designed such that the beverage can be drunk directly from the container after reheating in a microwave oven. In some embodiments, the container prior to sealing contains a headspace sufficient to allow for the expansion of water upon its conversion to ice (thereby minimizing stress to the container upon freezing of the beverage). In some embodiments, the disposable container can hold at least 236 mL (8 US fl. oz.). In some embodiments, the container is made from a recycled polymer in which air is injected into the core to create an insulating barrier, such that the container can still be held on the outer surface comfortably by a person's bare hand even when it contains a hot liquid. One such material is described in U.S. Pat. No. 7,585,439, the entire contents of which are incorporated herein by reference, except that in the event of any inconsistent disclosure or definition from the present specification, the disclosure or definition herein shall be deemed to prevail.

In some embodiments, the container can hold a liquid volume of at least one fluid ounce. The coffee-based beverage will assume the shape of the container when the beverage is dispensed into it and frozen. In some embodiments, the container may have a slight wedge shape such that the diameter of the bottom portion of the container is smaller than the top portion. In such a design, the frozen coffee-based beverage can be easily removed from the container by the consumer and dropped into another container such as a ceramic mug. The frozen beverage block in the shape of the disposable container can be easily slid out when warmed by the consumer's hand for a few seconds. A thin layer of water forms at the plastic container/ice interface, such that the frozen beverage can easily slide out of the disposable container. Some consumers may wish to drink the beverage from their own coffee mug rather than from the container in which it is packaged. Thus, the frozen beverage can be transferred to the mug, and the mug can then be reheated in a microwave oven. Although this choice is available to the consumer, it is not a requirement since the frozen coffee-beverage can be reheated and consumed directly in the disposable container in which the product was supplied.

In some embodiments, the frozen coffee-based beverage is packaged in a polymer container that does not have thermal insulating properties sufficient to prevent the outside of the container from becoming so hot after the reheating of the frozen coffee-based beverage as to make holding the container in a person's bare hands uncomfortable. In such cases, a paper-based insulating sleeve can be included in the packaging of the product so that the consumer can place the sleeve around the container to improve the comfort to the person holding the reheated beverage. Such a representative paper sleeve is described in U.S. Pat. No. 5,425,497, the entire contents of which are incorporated herein by reference, except that in the event of any inconsistent disclosure or definition from the present specification, the disclosure or definition herein shall be deemed to prevail.

Representative polymer materials from which the container and/or its lid can be constructed include but are not limited to polypropylene (PP), polycarbonate (PC), low density polyethylene (LDPE), high density polyethylene (HDPE), polyethylene terephthalate (PET), and the like, and combinations thereof In some embodiments, the choice of container can also be influenced by the oxygen transmission rate of the polymer material. Materials that provide better oxygen barrier properties can help to prevent the reintroduction of oxygen into the liquid coffee solution prior to the onset of ice formation. Although PET provides a better barrier to oxygen than polypropylene and, in some embodiments, can be used to make the container, PET has a relatively low softening point that can render it an unsatisfactory container material if the container containing the frozen beverage is to be heated in, for example, a microwave.

However, since the beverage produced according to the embodiments disclosed herein is degassed before being stored in the container, the freezing of the beverage will result in a higher quality ice that is lacking many of the bubbles and voids found in ice prepared from oxygen-infused water. Thus, because the frozen coffee-based beverage produced according to the methods described herein will form a higher quality ice barrier, then any reaction involving oxygen permeating the container (which one of skill would expect with traditional processes using materials like PP) will largely be restricted to the surface of the frozen beverage since such oxygen cannot adequately penetrate the ice itself in the absence of bubbles, voids, and other defects that may create pores or channels in the ice that allow for oxygen diffusion into the frozen beverage. Accordingly, the frozen coffee-based beverage produced according to the methods described herein beneficially forms a high quality ice barrier that unexpectedly allows the beverage to be stored in oxygen permeable containers (e.g., polypropylene (PP) and polyethylene terephthalate (PET)). As an additional benefit, the higher softening point of PP makes it suitable for use in a microwave and therefore allows greater flexibility for the storage of the frozen coffee-based beverage in oxygen permeable microwavable containers without exposing the frozen coffee-based beverage to the effects of oxygen degradation traditionally experienced with conventional processes.

In some embodiments, at least some portion of the container comprises a flexible wall. In some embodiments, the choice of material for the container can be extended to non-polymer materials such as glass if sufficient room is left in the container during the filling process so as to accommodate the expansion of the beverage solution as it transitions from its liquid to solid state during the freezing process.

Another consideration in the choice of container material is the material's compatibility with microwave heating. In some embodiments, the material has a softening temperature greater than the temperature to which the beverage will be heated. One non-limiting example of such a representative material is polypropylene.

Referring again to FIG. 1, the disposable container is sealed, as shown in step 104 of FIG. 1. In some embodiments, a lid is applied to the disposable container filled with the degassed coffee-based beverage. In other embodiments, the degassed coffee-based beverage is sealed in a container, such as an oxygen permeable container, which may also be microwaveable. In further embodiments still, the degassed coffee-based beverage is stored in an open container in which at least a portion of the degassed coffee-based beverage is exposed to air. As will be apparent to one of skill in the art, the containers enumerated herein are merely exemplary and additional types of containers may be used without departing from the spirit and scope of the present disclosure.

In some embodiments, the headspace above the degassed coffee-based beverage is controlled so that an inert atmosphere is trapped above the beverage after the lid seals the container. The headspace pressure of inert atmosphere can be controlled so that it can compensate for the drop in pressure in the headspace caused by freezing the beverage, thus preventing the lid and disposable container from deforming inwardly due to a lower internal pressure. In some embodiments, the lidding material contains an aluminum film to help prevent oxygen penetration into the container after it is sealed. In some embodiments, the lids are applied to the disposable containers filled with coffee-based beverage using standard hot stamping techniques and equipment available in the packaging industry. In other embodiments the lidding material may also be oxygen permeable including PET or PP.

In some embodiments, as shown in step 105 of FIG. 1, the coffee-based beverage is frozen. The freezing process is accomplished by cooling the coffee-based beverage below the solution's freezing point. The freezing can be accomplished by a variety of methods and at a variety of different cooling rates. In some embodiments, the beverage can be dispensed into individual disposable containers that are ultimately purchased by the consumer. In some embodiments, the containers are then sent to a refrigeration system to cool the temperature of the beverage below its freezing point. The freezing process is performed as quickly as possible after the coffee-based beverage is dispensed into the disposable containers and sealed, preferably in less than 1 hour after the dispensing has occurred. In some embodiments, the freezing takes place in a large walk-in style freezer, such as that produced by manufacturers such as Elliot-Williams Co., Inc. In some embodiments, the refrigeration unit is an in-line unit such as the CRYOLINE® series sold by Linde, Inc.

Other freezing techniques may also be employed including but not limited to the flash freezing and quick freezing techniques used in other industries, such as for freezing shrimp, ice cream, and other foods, which employ cryogenic refrigerants. For example, in such techniques, the food to be frozen may be conveyed through a tunnel while being exposed to a cryogenic refrigerant. It is envisioned that the methods described herein can be performed in a modern food packaging facility in which the necessary equipment to brew a coffee-based beverage, degas the beverage, dispense the beverage into disposable containers, seal the containers under an inert atmosphere, and freeze the product are available such that the entire process can be performed rapidly and efficiently. In some embodiments, the completed coffee-based product is shipped frozen to retail stores, purchased by a consumer as a frozen beverage in a disposable cup, and stored at home or work in a freezer maintained at a temperature below the freezing point of the beverage.

Since a brewed frozen coffee-based beverages produced according to the embodiment described herein is stored below zero degrees Celsius in its initial state, the consumer can now utilize the preparation system according to various embodiments disclosed herein to create a ready-to-drink coffee beverage at any desired temperature from just above zero degree Celsius to hot coffee (typically 60-70° C.). Additionally, the preparation system according to embodiments disclosed herein has the added benefit that the brewed coffee beverage is not subjected to inconstant water temperatures and uneven distribution of water by a water head utilized in traditional brewing systems, because the preparation system according to certain embodiments disclosed herein utilizes the previously brewed coffee-based beverages, which may be frozen and stored according to the previously described embodiments. Thus, the preparation system does not need to maintain a constant water temperature during a brew cycle as there is no brewing process required in the preparation system itself. In some embodiments, the preparation system can also have a thermocouple or other temperature measuring device (such as infrared photodiodes or thermistors) to measure the temperature of the preparation chamber and adjust the heating cycle to maintain the brewed coffee at a constant temperature after the ice block has been converted to a liquid state.

Figure 2A:
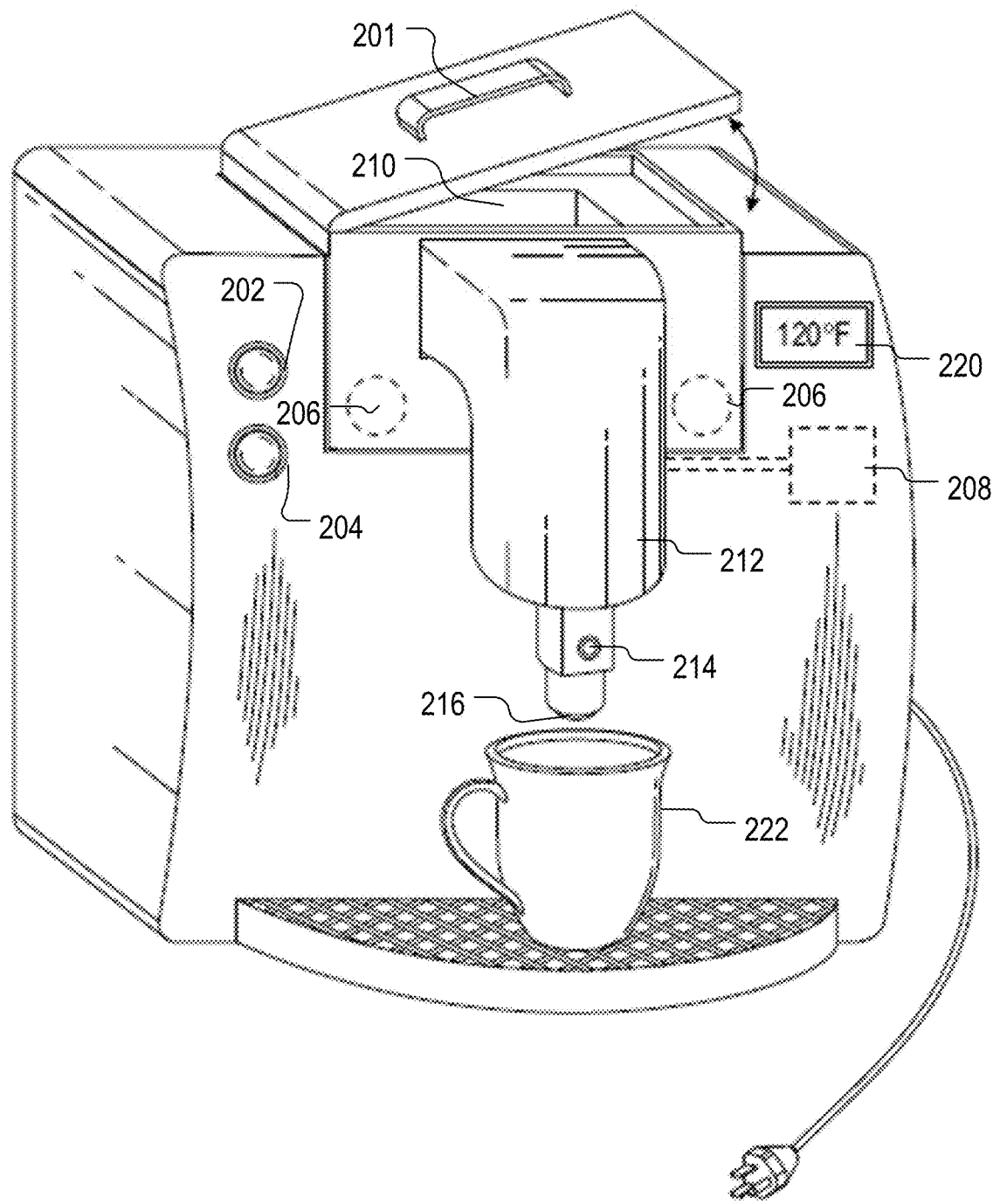
FIGS. 2A-C depict a front view of the coffee preparation system and the components forming the preparation system according to various embodiments described herein.

Referring now to FIG. 2A, a coffee preparation system according to one embodiment is shown. The coffee preparation system has a preparation chamber 210 having a lid with a handle 201 that the user may use to open and close the preparation chamber 210. The preparation chamber 210 has one or more electrical heating cartridges 206 disposed in sufficient proximity in the preparation chamber so as to apply heat to the chamber's contents. The desired beverage temperature may be selected by using one or more buttons 202, 204 disposed on the front side of the beverage preparation system and the beverage preparation system may also be activated using buttons 202, 204 or another button (not shown). Although not depicted in FIG. 2, in some embodiments, the beverage preparation system may also have buttons for setting a time for completing a brew cycle in advance. Additionally, the beverage preparation system may also contain one or more process controllers, such as proportional-integral-derivative (PID) controllers, 220 connected to a display disposed on the front side of the beverage preparation system that display information to the user, such as the time or currently selected temperature for brewing the coffee beverage. The beverage preparation system may also contain one or more thermocouples 208 to regulate the temperature of the heat applied to the preparation chamber 210, as described further herein. Once the beverage is heated to the proper temperature, the beverage may be drained through a spout 212 and outlet port 216 into a receiving vessel 222, such as a cup. The draining of the beverage through spout 212 and/or outlet port 216 may be controlled by a control valve within the spout 212, which, in certain embodiments, may controlled electronically by a heating control circuit to open when the coffee reaches the desired temperature or may be opened manually by the user pressing button 214. The sizes of the components and electrical specifications shown in FIG. 1 can be modified as needed to accommodate different sized starting materials (such as ice blocks of frozen coffee), materials used in manufacturing and desired heating times and cycles, and add-on features.

Figure 2B:
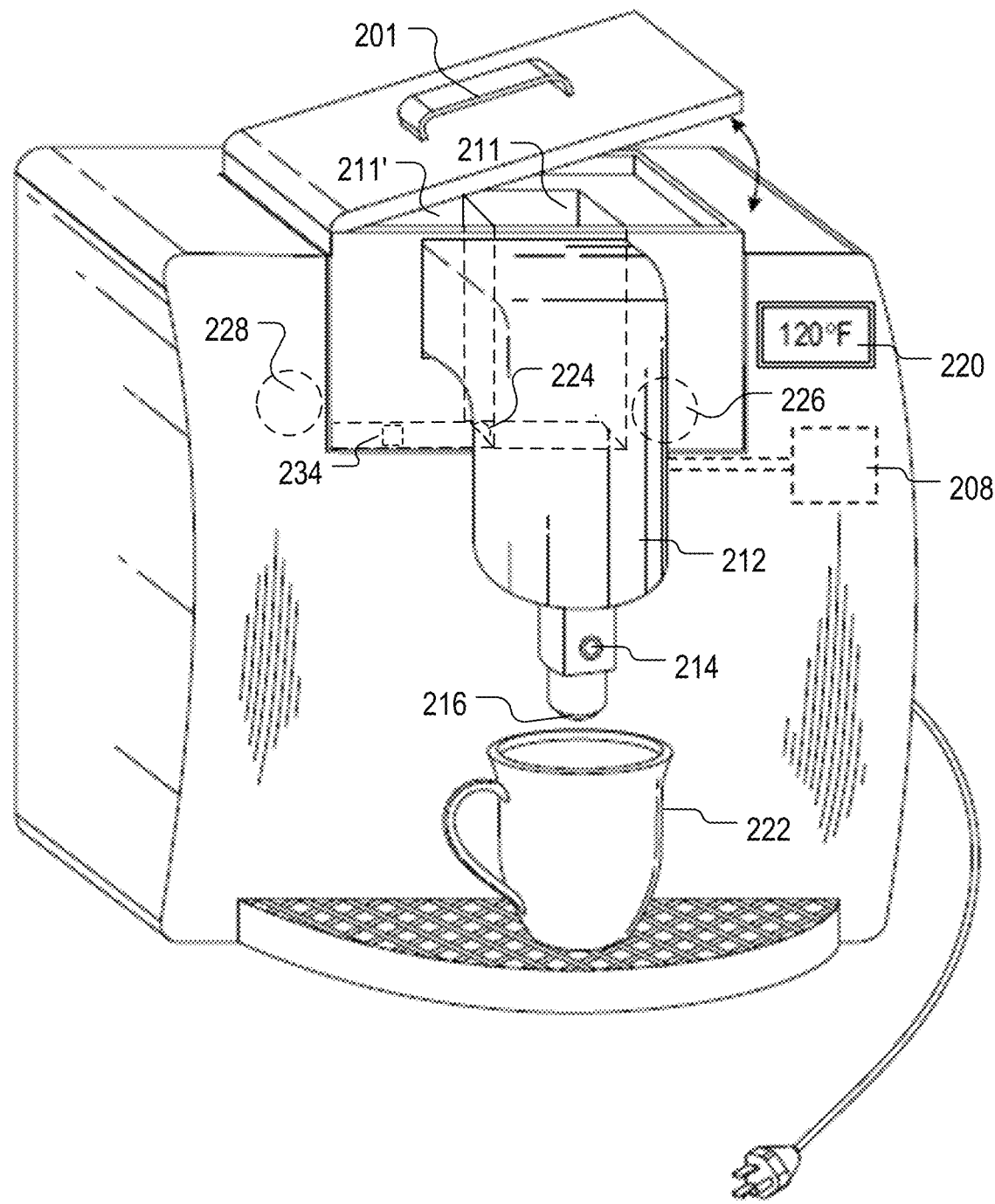
Figure 2C:
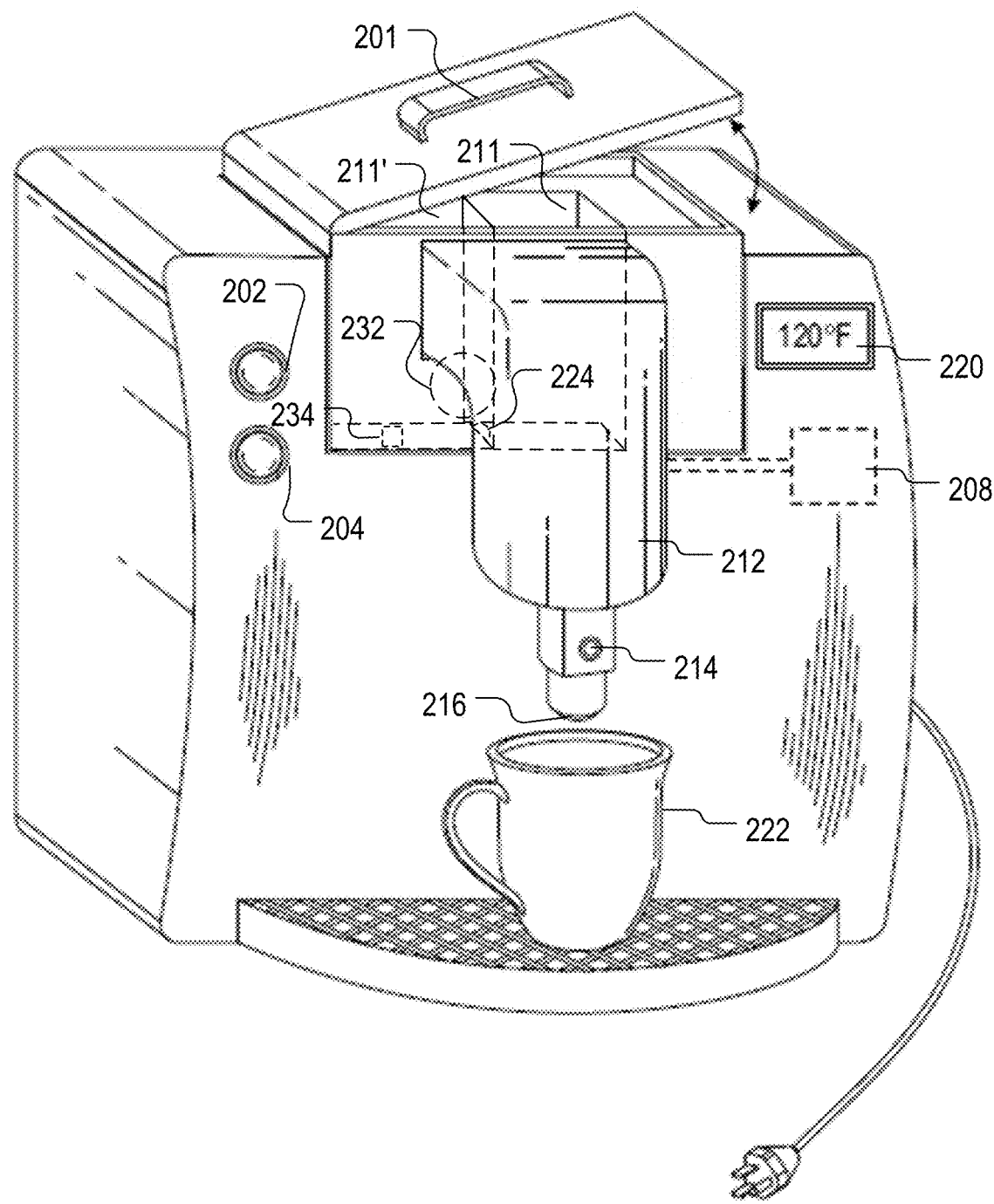

As depicted in the exemplary embodiments of FIGS. 2B and 2C, in some embodiments the preparation chamber 210 of the coffee preparation system depicted in FIG. 2A may be comprised of two separate preparation chambers 211 and 211'. Similar to the preparation chamber 210 shown in FIG. 2A, a first preparation chamber 211 (which may also be referred to as a melting chamber) may be used for heating a block of frozen liquid. As illustrated in FIGS. 2B and 2C, the temperature applied to the melting chamber by electrical heating cartridges 226 or 232 may be controlled by one or more thermocouples 208 that regulate the heat applied to the first preparation chamber. A second preparation chamber 211' (which may also be referred to as a heating chamber) may be disposed separately from melting chamber but in proximity to the melting chamber, as illustrated in FIGS. 2B and 2C depicting a potential adjacent second preparation according to certain embodiments. In such embodiments, the first and second preparation chamber may be in fluid communication and connected by a flow path, such as a through-hole or a channel 244 connecting the two chambers. As the block of frozen liquid in the first preparation chamber melts due to the heat being applied to the first preparation chamber 211 by the electrical heating cartridges 226 or 232, the runoff will drain into the through-hole or channel 224 and pass into the second preparation chamber 211'. The preparation chamber 211' is utilized primarily for heating the liquid beverage to the desired temperature for consumption. Heat may be applied to the heating chamber 211' by one or more electrical heating cartridges, which may be separate from the electrical cartridges utilized by the melting chamber as shown with electrical heating cartridges 226 and 228 in FIG. 2B or the same electrical heating cartridge 232 as shown in FIG. 2C. The heat applied to the heating chamber by the electrical cartridges may also be controlled by one or more thermocouples, which may be the same or separate thermocouples as thermocouple 208.

During use, the first preparation chamber will receive a frozen ice block of brewed coffee through a lid or opening in the first preparation chamber. Heat is selectively applied to the first preparation chamber from electrical cartridges in order to melt the frozen ice block of the brewed beverage. As the frozen ice block melts, the runoff drains into the second preparation chamber and heat is likewise selectively applied to the second preparation chamber from electrical cartridges in order heat the beverage to the desired temperature for consumption.

It should be noted that because the ice block is created according to the methods and processes described herein, it may be stored in an oxygen permeable container or even an ice cube tray like container that is openly exposed to oxygen on one side inasmuch as the process described herein forms a high quality ice barrier that reduces ingress of oxygen into the beverage once frozen. Thus, in certain embodiments, the frozen ice block may be removed from the oxygen permeable container or tray and placed in the preparation chamber such that it is in direct contact with the sidewalls of the heating chamber (or other surface to which heat is applied). In these embodiments, no cutting or puncturing of the packaging (e.g., via needle), or specific design of packaging to accommodate a needle to puncture the packaging to create a drain hole, is required. In addition, since the ice block maintains the reduced dissolve oxygen content at, for example, 2 PPM or below while frozen, there is no need for packaging having specialized oxygen barrier layers or properties (e.g., oxygen impermeable containers) built into the packaging, and which make recycling difficult. Further, because the ice block maintains the reduced dissolve oxygen content at, for example, 2 PPM or below while frozen, there is also no need for the addition of preservatives to the brewed beverage. Thus, coffee beans having an organic certification can maintain this certification when the brewed beverage is prepared and stored with the disclosed process as the beverage contains no added preservatives.

In some embodiments, the use of different electrical cartridges to apply heat to each of the two preparation chambers allows the system to selectively apply different levels of heat to each of the two chambers. Beneficially, this approach allows the system to apply a larger amount of heat (e.g., full heat) to the first preparation chamber without concern that there will be localized boiling of the liquid runoff in the first preparation chamber because the liquid runoff will drain into the second preparation chamber as the frozen ice block melts. Once the runoff liquid has reached the second preparation chamber, the system may then selectively apply heat to the second preparation chamber from electrical cartridges in order heat the beverage to the desired temperature for consumption. As described in connection with the embodiment depicted in FIG. 2A, the desired temperature for consumption may be selected using one or more buttons 202, 204. In some embodiments, the system may automatically delay the heating of the runoff liquid in the second preparation chamber for a period of time in order to allow sufficient time for a portion of the runoff liquid to flow from the first preparation chamber to the second preparation chamber.

Figure 3:
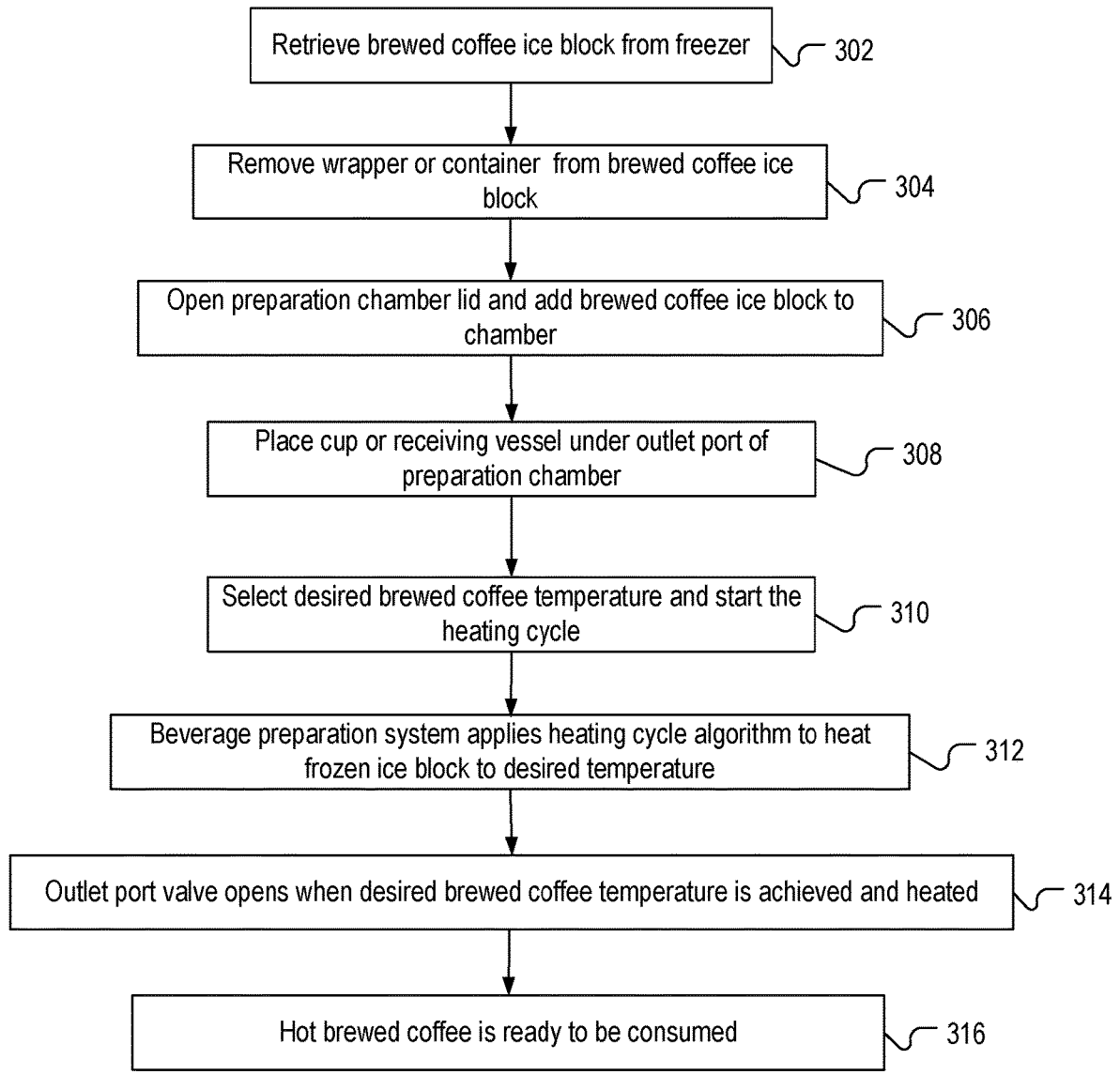
FIG. 3 depicts an exemplary process diagram depicting the steps for a user to utilize the coffee preparation system to heat a frozen degassed beverage block according to some embodiments.

Referring now to FIG. 3, an exemplary process for using the coffee beverage preparation according some embodiments is shown. At step 302, a consumer will retrieve a frozen brewed coffee ice block (such as those as described in U.S. Pat. No. 9,307,777 by the same inventor) from a freezer and remove the ice block from oxygen permeable wrapper or container step 304. At step 306, the ice block is then placed in the coffee preparation system chamber and the lid is closed. In certain embodiments, the oxygen permeable wrapper or container may be able to remain on the ice block and placed directly in the preparation chamber at step 306. In these embodiments, it is preferential to have a means to open or puncture the oxygen permeable wrapper or container before or after insertion into the preparation chamber, such that the liquid runoff may drain from the container. At step 308, the consumer places a coffee cup or other receptacle under the outlet port of the coffee preparation system, and at step 310 the desired brewed beverage temperature is selected from the control panel and then the consumer presses the start button. At step 312, the coffee preparation system will begin a power cycle to melt the frozen coffee. The heater system can be selected to heat the coffee as quickly as possible (e.g., full power) until the melted coffee reaches near the desired, set temperature. The temperature is monitored by a thermocouple sensor located in the coffee preparation chamber. In another preferred embodiment, the melted coffee temperature is controlled through a PID controller. At step 314, an electronically controlled valve is opened at the pre-selected desired coffee temperature and the hot coffee in the preparation chamber is allowed to flow into the consumer's cup and is ready for consumption at block 316. The power to the preparation chamber is automatically stopped, the outlet valve is closed and the chamber is ready to receive another frozen ice block. In another embodiment, the outlet valve may also be open manually during any portion of the heating cycle, such as by the user pressing button 214 described in connection with FIG. 2A.

In one embodiment, the preparation chamber is connected to an outlet port in which the liquid coffee flows to a cup or receptacle. The outlet port may have a manual and/or electronically operated valve that opens when the preset desired brewed coffee temperature in the preparation chamber is achieved. One benefit of such a system is that coffee can actually be brewed in the preparation chamber to have a cold or "iced coffee" temperature. For the coldest brewed coffee temperatures, it is envisioned that the outlet valve can be opened immediately on start of the preparation heating step and cold melted beverage will flow directly into the consumer's cup or other vessel as the frozen ice block begins to melt. Similarly, in the two chamber embodiment described in connection with FIGS. 2B-C, the cold or "iced coffee" temperature may be achieved by not having the second preparation apply heat at all and allowing the runoff liquid to flow directly in the consumer's cup or other vessel.

Figure 4:
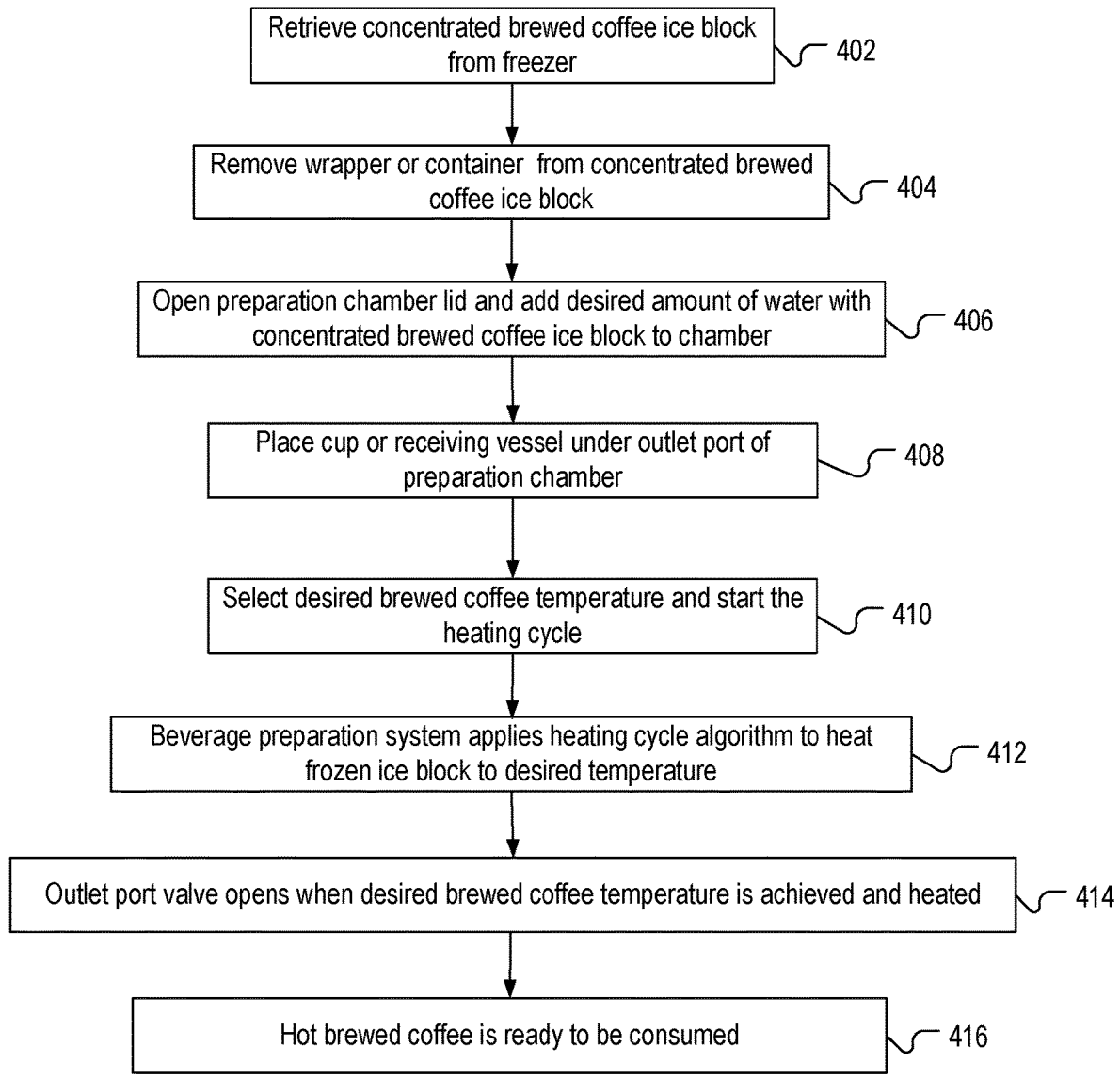
FIG. 4 depicts an exemplary process diagram depicting the steps for a user to utilize the coffee preparation system to heat a frozen degassed beverage concentrate according to some embodiments.

Referring now to FIG. 4, an exemplary process for using the coffee beverage preparation according to another embodiment is shown. At step 402, a consumer will retrieve a frozen brewed coffee ice block of coffee concentrate from the freezer. The user removes the concentrate from the oxygen permeable wrapper or container at step 404. At step 406, the user places the brewed coffee concentrate in the preparation chamber and the consumer can add water along with concentrate ice block to the preparation chamber. The water and ice block are warmed to generate a brewed coffee beverage with a brew strength determined by the amount of water added to the preparation chamber. In another embodiment, the preparation system may have two preparation chambers. One for heating the coffee concentrate and the other for receiving the liquid water. At step 408, the user places a receiving vessel under the outlet port of the preparation of chamber. In some embodiments, at step 410, the user selects the desired coffee temperature, and the heating cycle begins. At step 412, the coffee beverage preparation system applies a heating cycle algorithm to heat the frozen ice block to the desired temperature. At step 414, at the desired temperature, the outlet valve (or outlet valves, as the case may be) for the chamber is opened and the contents flow into a single container, vessel, or cup and mix to form a brewed coffee beverage that is ready to be consumed at step 416.

In further embodiments still, two preparation chambers may be connected by a flow path as described further in connection with FIGS. 2B-C. In this case, water may be added to the first or the second preparation chamber by the user or by the system itself. The coffee beverage preparation system may also apply two different heating cycle algorithms to the two chambers at step 412. The first heating cycle algorithm may be used to melt the frozen ice block and the second heating cycle algorithm may be used to heat runoff liquid to the desired temperature. In this embodiment, one valve may be utilized for allowing the contents to flow into the container or vessel.

Figure 5:
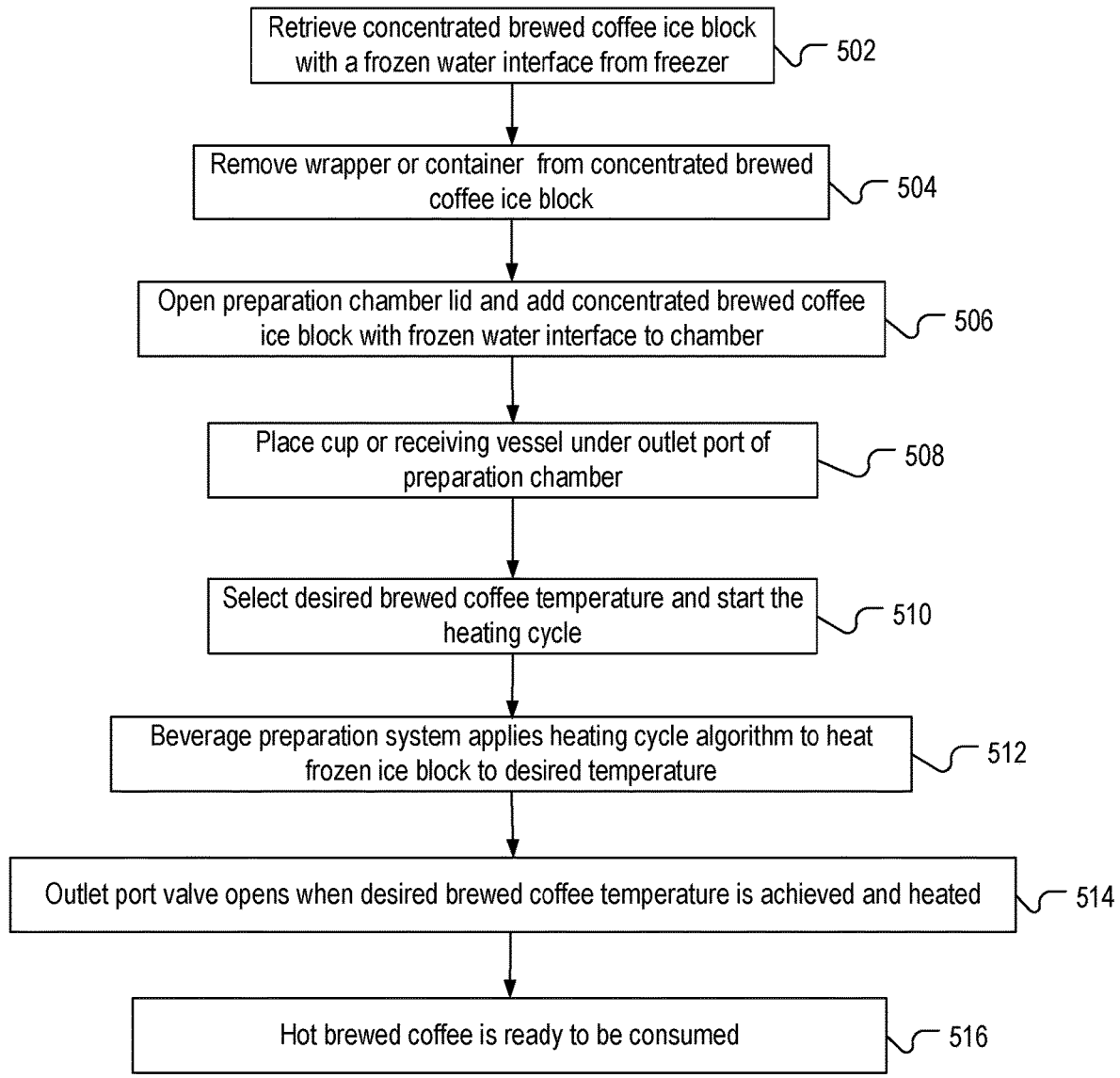
FIG. 5 depicts an exemplary process diagram depicting the steps for a user to utilize the coffee preparation system to heat a frozen degassed beverage concentrate having a frozen water interface according to some embodiments.

Referring now to FIG. 5, an exemplary process for using the coffee beverage preparation according to another embodiment is shown. At step 502, a consumer will retrieve a frozen brewed coffee ice block having a frozen water interface from the freezer. The user removes the brewed coffee ice block having a frozen water interface from the oxygen permeable wrapper or container at step 504. At step 506, the user places the brewed coffee ice block having a frozen water interface in the preparation chamber. In this embodiment, the user does not need to add water to the preparation chamber as the water interface and concentrated brewed coffee will mix as the frozen ice block melts. The water interface and ice block are warmed to generate a brewed coffee beverage. At step 508, the user places a receiving vessel under the outlet port of the preparation of chamber. In some embodiments, at step 510, the user selects the desired coffee temperature, and the heating cycle begins. At step 512, the coffee beverage preparation system applies a heating cycle algorithm to heat the frozen ice block to the desired temperature. In certain embodiments where two preparation chambers are used, one for melting and one for heating, the coffee beverage preparation system may apply two different heating cycle algorithms to the two chambers at step 512. The first heating cycle algorithm may be used to melt the frozen ice block and the second heating cycle algorithm may be used to heat runoff liquid to the desired temperature. At step 514, at the desired temperature, the outlet valves for the chamber is opened and the contents flow into the receiving vessel or cup to form a brewed coffee beverage that is ready to be consumed at step 516.

Figure 6:
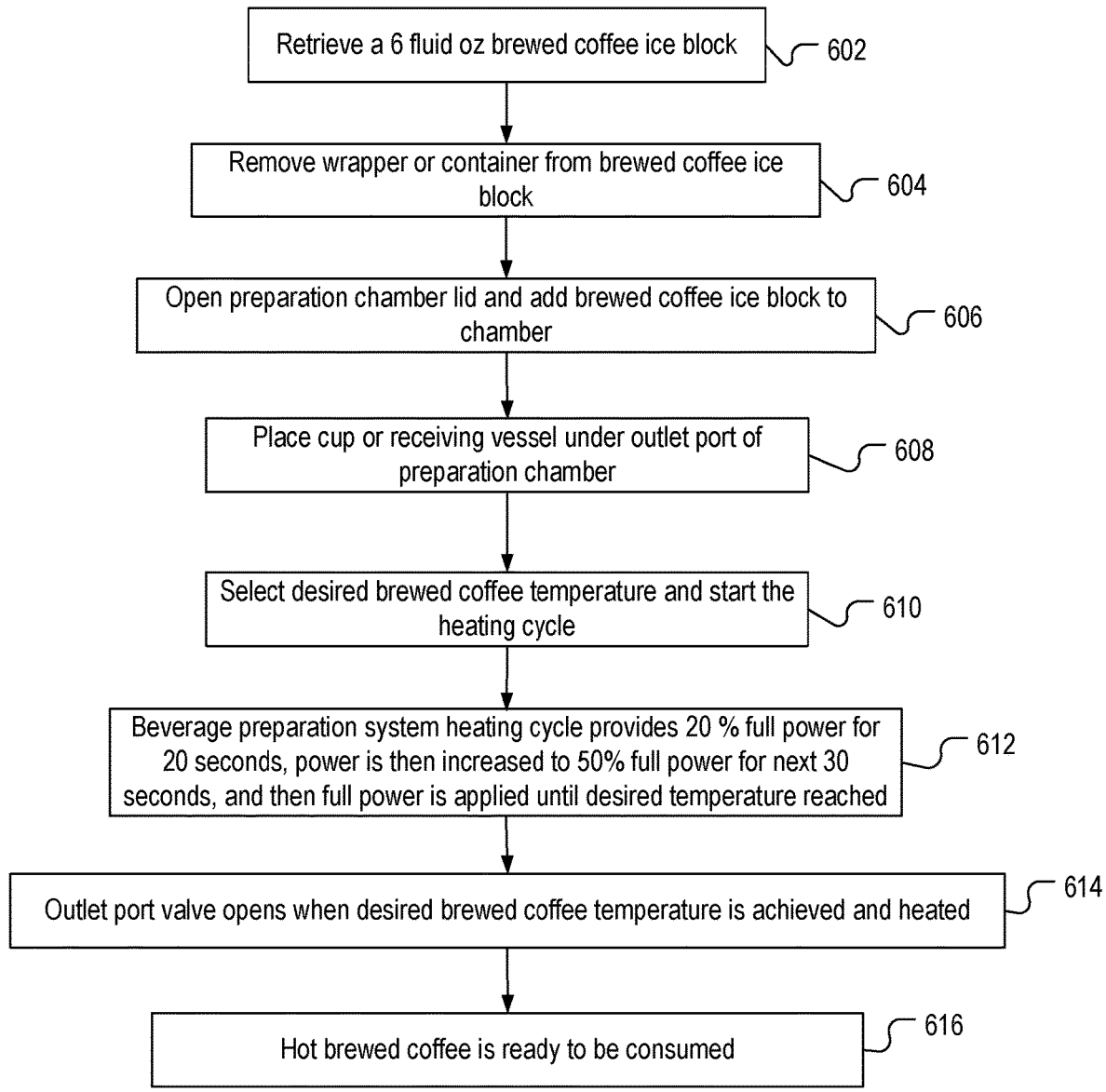
FIG. 6 depicts an exemplary process diagram depicting the steps for selectively heating a frozen degassed beverage ice block to a predetermined temperature according to some embodiments.

Referring now to FIG. 6, an exemplary process for using the coffee beverage preparation according to another embodiment is shown. At step 602, a consumer will retrieve a frozen brewed coffee ice block from the freezer, which may be, for example, a 6 fluid oz. frozen brewed coffee ice block. The user removes the 6 fluid oz. brewed coffee ice block from the oxygen permeable wrapper or container at step 604. At step 606, the user places the 6 fluid oz. brewed coffee ice block in the preparation chamber. At step 608, the user places a receiving vessel under the outlet port of the preparation of chamber. In some embodiments, at step 610, the user selects the desired coffee temperature, and the heating cycle begins.

At step 612, the coffee beverage preparation system applies a heating cycle algorithm to heat the frozen ice block to the desired temperature. In this embodiment, the heating cycle algorithm comprises a predetermined number of intervals in which the thermocouple regulates the heat applied to the preparation system such that the beverage preparation system provides heat to the preparation system at 20% full power for 20 seconds, after which power is then increased to 50% full power for next 30 seconds, and then full power is applied until desired temperature reached, although a person of skill in the art would recognize that these timeframes and percentages are merely illustrative and variations may made without departing from the scope and spirit of the present disclosure. In any event, one non-limiting consideration of the heating cycle algorithm is to prevent localized bowling of the coffee beverage in the preparation chamber as the frozen ice block begins to melt. In this way, certain embodiments may also include a stirrer or agitator, such as indicated by element 234 in FIGS. 2B and 2C, in the preparation chamber to assist in achieving more uniform temperature throughout the melting beverage mixture and to deliver the heat from side walls into the ice block more efficiently.

Although not shown in FIG. 6, in certain embodiments where two preparation chambers are used, one for melting and one for heating, the coffee beverage preparation system may apply two different heating cycle algorithms to the two chambers at step 612. The first heating cycle algorithm may be used to melt the frozen ice block. Because the runoff from the frozen ice block will pass into the second preparation chamber in this embodiment, there is less concern over localized boiling of the coffee beverage in the first preparation chamber as the frozen ice block begins to melt. Accordingly, the first heating algorithm may apply full or nearly full power to the first preparation chamber in order to melt the ice. A second heating cycle algorithm (which may be a sub-part of the first heating cycle algorithm) may be used to heat runoff liquid to the desired temperature. For example, the second heating algorithm may delay a short period of time after the first heating algorithm begins in order to allow the runoff to begin reaching the second preparation chamber and then apply a steady level of heat to the second preparation chamber. In some embodiments, the second heating algorithm may apply a gradually increasing level of heat the second preparation chamber, such as 10-30% of full power for a period of 20 seconds, and then increase the power to 20-50% or even to full power until the desired temperature is reached. Again, a person of skill in the art would recognize that these timeframes and percentages are merely illustrative and variations may made without departing from the scope and spirit of the present disclosure.

Referring again to FIG. 6, at step 614, the outlet valves for the chamber opens at the desired temperature and the contents flow into the receiving vessel or cup to form a brewed coffee beverage that is ready to be consumed at step 616.

Although features may be described herein with reference to a particular embodiment or Figure, one skilled in the art would understand that the same or similar features could be used in connection with the additional embodiments described herein. Thus, reference to a particular embodiment or Figure is not to be construed as limiting in any way.

In addition to coffee beverages, it is also envisioned that teas and other brewed beverages of the like can be prepared by the system described in this disclosure.

In some embodiments, liquid pre-brewed cold coffee (not frozen) can also be added to the preparation chamber and heated to desired temperature, or can be mixed with frozen brewed coffee in the preparation chamber and heated to the desire temperature.

In other embodiments the consumer can add a small amount of water (approximately 10-15% of the volume of the ice block) with the regular brew strength ice block to the preparation chamber. The liquid water can act as a temperature regulator to prevent the coffee compounds located at the surface of the ice block from being over heated during the initial heating phase.

In other embodiments the heating power percentage, or duty cycle, is adjusted during the preparation phase such that the heating power is gradually increased in either a stepwise fashion or in a linear fashion as the ice block melts to prevent localized boiling of the brewed coffee melt. The brewer can use PID control system to regulate the heater power and use thermocouple to monitor the coffee temperature during the heating step and feedback that temperature data to the PID controller.

The mechanism for supplying heat to the preparation chamber may be electrical cartridges and PID controllers, such as those supplied by WATLOW INC.®, wired heating elements, or by infrared lamps, or microwave generator, convection heating, or inductively coupled heating or other energy sources capable of melting ice and the means to control the heating rate. The heating power will be sufficient to transform a 6 fluid ounce single serve coffee ice block to a hot brewed beverage in a consumer's cup in less than 5 minutes and in some cases, preferably in less than 2 minutes from start of the heating phase.

In another preferred embodiment, the beverage system includes a heating control circuit that implements a heating cycle control algorithm is designed to control the percentage power so as to avoid localized boiling of the small amount of liquid coffee in the melt during the initial heating preparation step. As more of the ice block is melted, the power supplied to the preparation chamber can be increased. Nearing the complete melting of the ice block the power is increased to full power so as to reach the target coffee temperature as soon as possible. For example, in the embodiment shown in FIG. 6, the heating cycle control algorithm uses an initial heating percentage power of approximately 20 percent of full power for 30 seconds, then self-adjusts to a percentage of full power of approximately 50 percent for 30 seconds, and self-adjusts to full power for the remainder of the heating cycle, although a person of skill in the art would recognize that these times and percentages of power can be varied to achieve the melting of the ice block and heating of the beverage to the desired brewed beverage temperature with a certain time frame. In another embodiment, the desired time for full heating the ice block is 5 minutes or less to achieve the desired brewed beverage temperature and in another embodiment the time is targeted to be 2 minutes or less to reach the desired temperature. In the latter scenario, a more aggressive algorithm schedule can be taken to achieve full heating of the beverage to the desired temperature within the target timeframe.

In a preferred embodiment, the preparation chamber is made from aluminum to improve heat conductivity and distribution to the frozen ice block. In another embodiment the bottom of the heating chamber is aluminum and the side walls are made of heat resistant plastic that are thermally isolated from the bottom heating element.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A brewed coffee preparation system comprising:
    a degassed frozen brewed coffee beverage product; and
    a brewing machine comprising:
        a preparation chamber comprising a melting chamber and a heating chamber connected to the melting chamber by a flow path,
        wherein the melting chamber comprises a receptacle physically formed by an open top coverable by a lid, a bottom, and one or more connected sidewalls that form a first compartment configured to allow the degassed frozen brewed coffee beverage product to be placed in the first compartment through the open top;
        a first heating cartridge coupled to the melting chamber and configured to apply heat to at least one of the melting chamber's bottom or connected sidewalls to heat the at least one of the bottom or connected sidewalls of the melting chamber and melt the degassed frozen brewed coffee beverage product while disposed within the first compartment of the melting chamber;
        wherein the heating chamber comprises a separate receptacle physically formed by a bottom and one or more connected sidewalls that form a second compartment for receiving a melted fluid runoff from the degassed frozen brewed coffee beverage product disposed within the first compartment of the melting chamber through the flow path;
        a second heating cartridge coupled to the heating chamber and configured to apply to heat to at least one of the heating chamber's bottom or connected sidewalls to heat the at least one of the bottom or connected sidewalls of the heating chamber and the melted fluid runoff while disposed within the second compartment of the heating chamber;
        a heating control circuit that controls a heating rate for at least one of the heating cartridges;
        an outlet port in fluidic communication with the heating chamber; and
        an electronically controlled valve secured to the outlet port that is configured to release fluid content of the heating chamber into a receiving vessel.

2. The brewed coffee preparation system of claim 1, wherein the heating control circuit is configured to control the heating rate for the second heating cartridge coupled to the heating chamber by progressively increasing the heating rate for a predetermined number of intervals so as to prevent localized boiling of the melted fluid runoff from the degassed frozen brewed coffee beverage during a preparation cycle.

3. The brewed coffee preparation system of claim 1, wherein the brewing machine further comprises a thermocouple and a proportional-integral-derivative (PID) control system that measures a temperature of the melted fluid runoff.

4. The brewed coffee preparation system of claim 3, wherein the PID control system is communicatively coupled to the heating control circuit and the heating control circuit is configured to progressively increase the heating rate at each of a predetermined number of intervals in order heat the melted fluid runoff to a desired temperature.

5. The brewed coffee preparation system of claim 1, wherein the electronically controlled valve is programmed to open the outlet port and release the fluid content of the heating chamber into the receiving vessel when the fluid reaches a predetermined temperature.

6. The brewed coffee preparation system of claim 1, wherein the heating chamber further includes an agitator that stirs the melted fluid runoff to assist in reducing localized boiling.

7. The brewed coffee preparation system of claim 1, wherein the degassed frozen brewed coffee beverage product comprises a frozen package of brewed coffee having a reduced dissolved oxygen content at a time of freezing; and
wherein the degassed frozen brewed coffee beverage is stored in an oxygen permeable container before freezing.

8. The brewed coffee preparation system of claim 1, wherein the degassed frozen brewed coffee beverage product comprises an ice block of concentrated brewed coffee and the preparation chamber is configured to receive water and heat a mixture of the water and the ice block of concentrated brewed coffee.

9. The brewed coffee preparation system of claim 1, wherein the heating control circuit is configured to control at least one of the heating cartridges to heat the melted fluid runoff to a predetermined temperature for consumption.

10. The brewed coffee preparation system of claim 9, wherein the predetermined temperature is selected using a PID control system on an outside wall of the brewed coffee preparation system.

11. A brewed beverage preparation system comprising:
a degassed frozen brewed beverage; and
a brewing machine comprising:
a preparation chamber for receiving the degassed frozen brewed beverage, wherein the preparation chamber comprises a melting chamber physically formed by a bottom and connected sidewalls that form a first compartment configured to receive the degassed frozen brewed beverage and for melting the degassed frozen brewed beverage while the degassed frozen brewed beverage is disposed within the first compartment of the melting chamber, and a heating chamber comprising a separate receptacle physically formed by a bottom and one or more connected sidewalls that form a second compartment configured to receive a melted fluid runoff of the degassed frozen brewed beverage and heat the melted fluid runoff;
a first heating cartridge coupled to the melting chamber and configured to apply heat to at least one of the melting chamber's bottom or connected sidewalls to melt the degassed frozen brewed coffee beverage product while disposed within the first compartment of the melting chamber;
a second heating cartridge coupled to the heating chamber and configured to apply heat to at least one of the heating chamber's bottom or connected sidewalls to heat the melted fluid runoff while disposed within the second compartment of the heating chamber;
a heating control circuit that controls a heating rate of at least one of the heating cartridges;
an outlet port in fluidic communication with the heating chamber; and
an electronically controlled valve secured to the outlet port that is configured to release heated fluid content of the heating chamber into a receiving vessel.

12. The brewed beverage preparation system of claim 11, wherein the brewing machine further comprises a proportional-integral-derivative (PID) control system for selecting a predetermined desired temperature for a released heated fluid content.

13. A beverage preparation system comprising:
a frozen beverage; and
a brewing machine comprising:
a melting chamber physically formed by an open top, a bottom, and connected sidewalls for receiving the frozen beverage and melting the frozen beverage;
a first heating cartridge coupled to the melting chamber and configured to apply heat to at least one of the melting chamber's bottom or connected sidewalls to melt the frozen beverage when disposed within the first compartment of the melting chamber;
a heating chamber physically formed by a bottom and one or more connected sidewalls in fluid communication with the melting chamber for receiving a melted fluid runoff from the frozen beverage and heating the melted fluid runoff from the frozen beverage when heat is applied to the heating chamber by one or more of: the first heating cartridge or a second heating cartridge;
an outlet port in fluidic communication with the heating chamber; and
an electronically controlled valve secured to the outlet port that is configured to release heated fluid into a receiving vessel.

14. The beverage preparation system of claim 13, wherein the second heating cartridge applies heat to the heating chamber and is coupled to the heating chamber and configured to apply heat to at least one of the heating chamber's bottom or connected sidewalls to heat the melted fluid runoff while disposed within the second compartment of the heating chamber; and
a heating control circuit that controls a heating rate of at least one of the first and second heating cartridges.

15. The beverage preparation system of claim 14, wherein the heating control circuit is configured to control the heating rate for the second heating cartridge by progressively increasing the heating rate for a predetermined number of intervals so as to prevent localized boiling of the melted fluid runoff.

16. The beverage preparation system of claim 13, wherein the melting chamber and the heating chamber are formed adjacently to one another.

17. The beverage preparation system of claim 16, wherein the first heating cartridge is configured to apply heat to the first and second compartment formed adjacently to one another.

18. The beverage preparation system of claim 13, wherein the heating chamber further comprises an agitator that stirs the melted fluid runoff to assist in reducing localized boiling.

19. The beverage preparation system of claim 13, wherein the brewing machine further comprises a thermocouple and a proportional-integral-derivative (PID) control system that measures a temperature of the melted fluid runoff from the frozen beverage.

20. The beverage preparation system of claim 19, wherein the electronically controlled valve is programmed to open the outlet port and release the melted fluid runoff into the receiving vessel when the melted fluid runoff reaches a predetermined temperature.

* * * * *